No. 877,022. PATENTED JAN. 21, 1908.
J. W. WALDORF.
MOTOR VEHICLE.
APPLICATION FILED SEPT. 19, 1907.
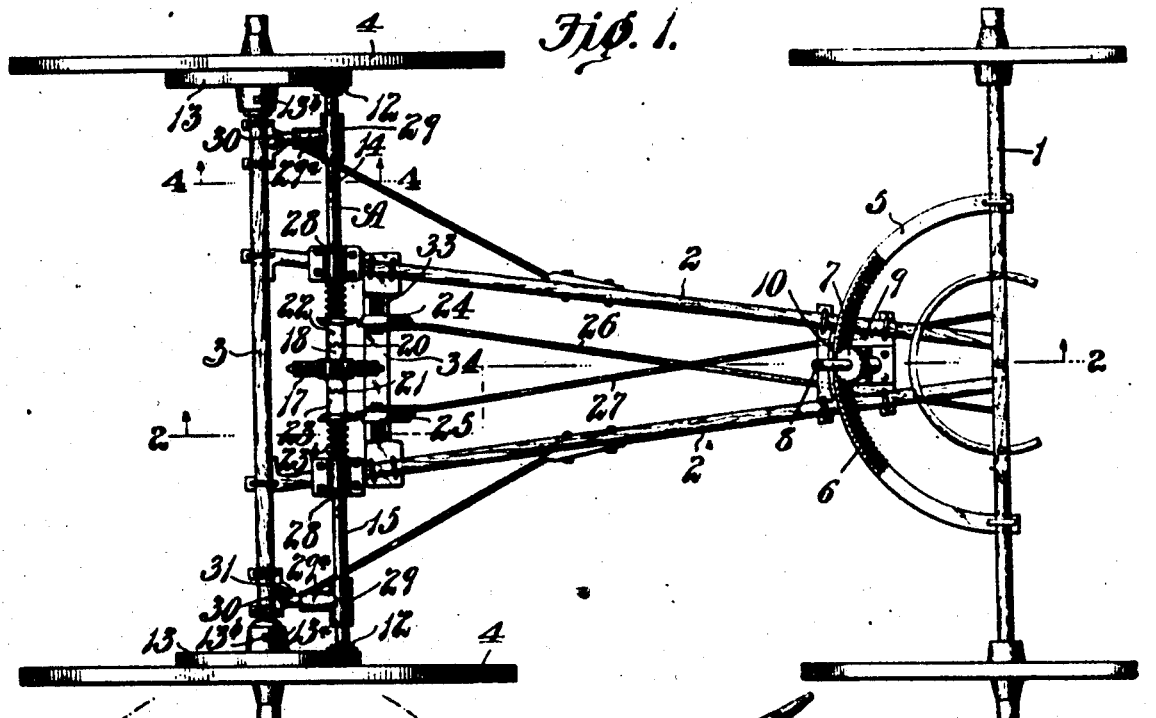
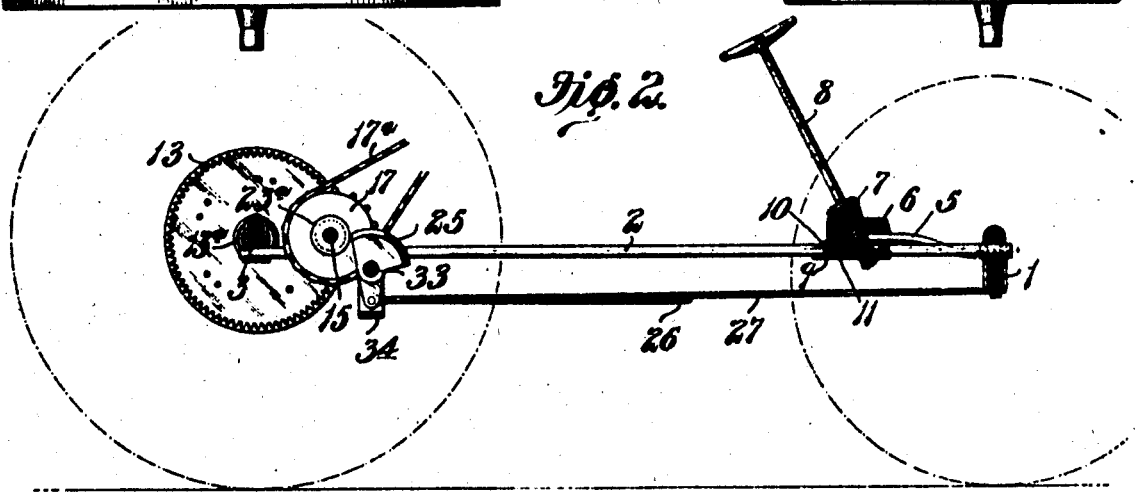
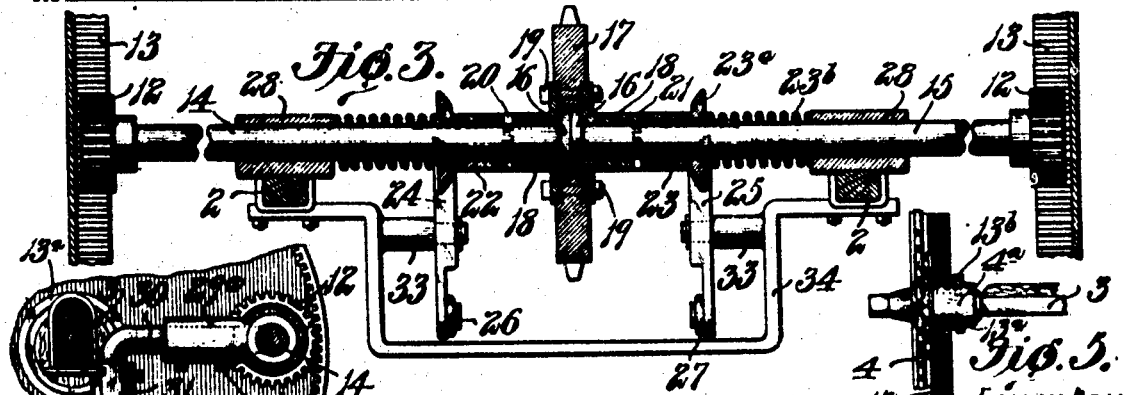
Witnesses: Inventor:
Joseph W. Waldorf.
By Bakewell Cornwall Attys

UNITED STATES PATENT OFFICE.

JOSEPH W. WALDORF, OF ST. LOUIS, MISSOURI.

MOTOR-VEHICLE.

No. 877,022.   Specification of Letters Patent.   Patented Jan. 21, 1908.

Application filed September 19, 1907. Serial No. 393,659.

*To all whom it may concern:*

Be it known that I, JOSEPH W. WALDORF, a citizen of the United States, residing at St. Louis, Missouri, have invented a certain new and useful Improvement in Motor-Vehicles, of which the following is a full, clear, and exact description, such as will enable others skilled in the art to which it appertains to make and use the same, reference being had to the accompanying drawings, forming part of this specification, in which—

Figure 1 is a top plan view of the underframe of a vehicle provided with a driving gear and a steering gear constructed in accordance with my invention; Fig. 2 is a vertical sectional view taken on the line 2—2 of Fig. 1; Fig. 3 is an enlarged vertical longitudinal sectional view taken through the center of the drive shaft; Fig. 4 is an enlarged sectional view taken on the line 4—4 of Fig. 1; and Fig. 5 is an enlarged detail view showing the construction of one of the internal gears that are carried by the rear wheels.

This invention relates to motor vehicles, and has for its object to provide a novel and simple form of driving gear and also a steering gear which can be applied to an ordinary horse-propelled vehicle to convert it into a motor-driven vehicle.

Briefly described, my improved driving gear consists of a driving shaft provided with a plurality of pinions which are adapted to coöperate with gears connected to the rear wheels of the vehicle, a driving sprocket wheel mounted on said shaft, and means actuated by the front axle of the vehicle for disconnecting one of said pinions from said driving sprocket wheel when the front axle of the vehicle turns, thereby providing a differential or compensating gear which permits the rear wheels of the vehicle to travel at different rates of speed.

Referring to the drawings which illustrate the preferred form of my invention, 1 designates the front axle of a vehicle, 2 designates the reach bars of the underframe, and 3 the rear axle on which the rear wheels 4 are rotatably mounted.

The steering mechanism comprises a segmental-shaped bar 5 secured to the front axle 1 and provided with internal gear teeth 6 that mesh with a beveled pinion 7 on the lower end of an inclined steering shaft 8. A plate 9 is secured to the reach bars 2 to form a bearing for the lower end of the steering shaft, and a raceway 10 is secured to said plate to receive ball or roller bearings 11 on which the segmental-shaped bar 5 rests. This forms a very efficient steering mechanism and one which can be applied to an ordinary horse-propelled vehicle at a small cost.

The driving gear comprises a drive shaft A arranged parallel to the rear axle 3 and provided at its ends with pinions 12 that mesh with internal gears 13 secured to the inner sides of the rear wheels 4. Said drive shaft A is composed of two sections 14 and 15 each of which is provided at its inner end with a disk-shaped head 16, as shown in Fig. 3, said heads butting against each other and being mounted inside of the hub of a sprocket wheel 17 which receives the driving chain 17ª. The hub of the sprocket wheel 17 is formed by two flanged sleeves 18 which are secured by fastening devices 19 to the sprocket wheel and the vertical flanges of said sleeves are separated, as shown in Fig. 3, to form a housing for the heads 16 on the ends of the drive shaft sections, thereby permitting the two sections 14 and 15 of the drive shaft to rotate independently of each other but preventing said sections from moving longitudinally relatively to each other. The hub of the sprocket wheel 17 is loosely mounted on the drive shaft and is provided with two sets of clutch teeth 20 and 21 that coöperate with clutch members 22 and 23 which are splined to the drive shaft on each side of the hub of the sprocket wheel. When both sets of clutch teeth on the hub of the sprocket wheel are in engagement with the clutch members 22 and 23 rotary movement will be imparted to both sections of the drive shaft and consequently, both of the rear wheels of the vehicle will be positively driven at the same speed by means of the pinions on the drive shaft that mesh with the internal gears on the rear wheels.

To permit the vehicle to turn properly it is necessary for the inside rear wheel to travel slower than the outside rear wheel and to this end I have provided means for automatically disconnecting the drive pinion for the inside rear wheel from the driving sprocket 17. I accomplish this preferably by means of pivotally mounted cams 24 and 25 which engage and move the clutch members 22 and 23, respectively, out of engagement with the clutch teeth on the hub of the sprocket wheel 17, said cams being controlled by rods 26 and 27, respectively, that are secured to the front axle 1. When the vehicle is turned to the right the rod 27 will be pulled forwardly and thus move the cam 25 rearwardly to cause it to engage the beveled collar 23ª on the clutch member 23, thereby moving said clutch member out of engagement with the teeth 21 on the hub of the sprocket wheel so as to disconnect the section 15 of the drive shaft from the driving sprocket 17. The rod 26 which controls the cam 24 will also be moved when the vehicle turns to the right, but said cam will be moved forwardly so that it does not engage the beveled collar on the clutch member 22, said clutch member remaining in engagement with the clutch teeth 20 on the hub of the sprocket wheel so that the outside rear wheel of the vehicle will be positively driven. When the front axle resumes its former position, the cam 25 will be carried out of engagement with the clutch member 23 and a coiled spring 23ᵇ, which is interposed between said member and a shaft bearing 28 on the reach bar, will move said member 23 back into engagement with the hub of the sprocket wheel.

When the vehicle turns to the left the cam 24 will engage the clutch member 22 so as to disengage the section 14 of the drive shaft from the sprocket wheel 17. The drive shaft A is mounted in the bearings 28 on the reach bars and also in bearings 29 carried by the rear axle. The bearings 28 are secured to the reach bars by clips so that they can be easily adjusted into any desired position, and the bearings 29 are also adjustable. Each of said bearings 29, as shown clearly in Fig. 4, is provided with a rearwardly extending hollow shank 29ª that fits over a rod 30 having a depending portion which is adjustably mounted in a tubular bearing 31 carried by the rear axle. The depending portion of the rod 30 is secured in the bearing 31 by set screws 31ª so that the rod can be adjusted vertically, and the hollow shank 29ª of the bearing 29 is secured to the rod 30 by set screws 29ᵇ so that the bearings 29 can be adjusted horizontally. In this way I am able to adjust the bearings 29 for the drive shaft both vertically and horizontally so as to cause the pinions 12 to mesh properly with the internal gears 13 on the rear wheels. These internal gears 13 are of novel construction and, as shown in Figs. 2 and 5, each one is provided with a hub 13ª that fits over the hub 4ª of the rear wheel. Set screws 13ᵇ are mounted in the hubs 13ª of the gears to center them properly on the wheel, and said gears are preferably connected to the spokes of the wheel by means of clips or other suitable fastening devices. The cams 24 and 25 are pivotally mounted on studs 33 carried by a bar 34 which is secured to the reach bars 2, as shown in Fig. 3.

A driving gear of this construction can be manufactured cheaply and can be applied to an ordinary carriage or horse-propelled vehicle so as to enable an engine to be used for propelling the vehicle. I prefer to provide the rear wheels with internal gears, as herein shown, but it will, of course, be understood that external gears could be used without departing from my invention. Furthermore, I wish it to be understood that my invention is not limited to cams for moving the clutch members out of engagement with the hub of the driving sprocket as various other devices could be used for this purpose.

Having thus described my invention, what I claim as new and desire to secure by Letters Patent is:

1. A driving gear for vehicles, comprising gears adapted to be connected to the rear wheels of a vehicle, a drive shaft formed in sections, pinions secured to said sections and meshing with said gears, a drive sprocket loosely mounted on said shaft and provided with clutch members, clutch members splined to the sections of the drive shaft and cooperating with those on the drive sprocket for connecting the sections of the drive shaft to said sprocket, and automatic means for disconnecting either section of the drive shaft from said drive sprocket; substantially as described.

2. A driving gear for vehicles, comprising gears adapted to be connected to the rear wheels of a vehicle, a drive shaft comprising independent sections that are provided with pinions which mesh with said gears, a driving sprocket provided with clutch members, cooperating clutch members splined to said shaft sections, yielding means for forcing the clutch members on the shaft sections into engagement with the clutch members on the driving sprocket, and means for actuating the clutch members on the drive shaft to disconnect sections thereof from the driving sprocket; substantially as described.

3. In a driving gear for vehicles, gears adapted to be connected to the rear wheels of a vehicle, a drive shaft comprising two sections each of which is provided with a pinion that meshes with one of said gears, a drive sprocket loosely mounted on the inner end portions of the sections of said drive shaft and provided with clutch members, means for preventing said shaft sections from moving longitudinally relatively to said sprocket, clutches splined to the drive shaft sections for connecting said shaft sections to said sprocket, and automatically operated means for actuating said clutches; substantially as described.

4. In a driving gear for vehicles, a drive shaft comprising two independent sections which are provided at their inner ends with disk-shaped heads that butt against each other, a driving sprocket loosely mounted on the end portions of said shaft sections and having a hub which embraces said heads, and clutch members splined to said shaft sections and adapted to coöperate with clutch teeth on the hub of the sprocket; substantially as described.

5. A vehicle comprising front and rear axles provided with wheels, gears connected to the wheels on the rear axle, a drive shaft comprising two sections, each of which is provided with a pinion that meshes with one of said gears, clutch members splined to said shaft sections, a driving sprocket arranged between said clutch members and having teeth which coöperate with teeth on the clutch members, devices for moving said clutch members out of engagement with the driving sprocket, and a connection between said devices and the front axle of the vehicle; substantially as described.

6. A vehicle comprising front and rear axles provided with wheels, gears carried by the wheels on the rear axle, a drive shaft composed of two sections provided adjacent their outer ends with pinions that mesh with the gears on the rear wheels, a driving sprocket rotatably mounted on the inner end portions of said shaft sections, clutch members splined to said shaft sections and coöperating with teeth on the hub of the driving sprocket, pivotally mounted cams for moving said clutch members out of engagement with the driving sprocket, and rods secured to said cams and to the front axle of the vehicle; substantially as described.

7. A vehicle comprising front and rear axles provided with wheels, gears connected to the wheels on the rear axle, a drive shaft provided with pinions that mesh with said gears, bearings in which said shaft is mounted, and means for adjusting said bearings horizontally and vertically relatively to the rear axle; substantially as described.

8. A vehicle comprising front and rear axles provided with wheels, gears carried by the wheels on the rear axle, a drive shaft provided with pinions that mesh with said gears, socket members carried by the rear axle, rods having depending portions which are vertically adjustable in said sockets, and bearings for the drive shaft adjustably mounted on said rods; substantially as described.

9. A vehicle comprising front and rear axles provided with wheels, internal gears arranged on the inside of the wheels on the rear axle and provided with hubs which surround the hubs of the rear wheels, a drive shaft mounted in adjustable bearings that are carried by the rear axle, said drive shaft being formed in two sections, a pinion on the outer end of each section which meshes with the internal gear of one of the rear wheels, a driving sprocket, clutches for connecting the sections of the drive shaft to said driving sprocket, pivotally mounted cams coöperating with beveled collars on said clutches for moving them out of engagement with the driving sprocket, rods connecting said cams to the front axle of the vehicle, and a member secured to the reach bars of the vehicle for supporting said cams; substantially as described.

In testimony whereof I hereunto affix my signature in the presence of two witnesses, this sixteenth day of September, 1907.

JOSEPH W. WALDORF.

Witnesses:
WELLS L. CHURCH,
GEORGE BAKEWELL.